(12) United States Patent
Bayersdorfer et al.

(10) Patent No.: US 10,953,792 B2
(45) Date of Patent: Mar. 23, 2021

(54) OPTICAL CONDUCTOR AND LIGHTING SYSTEM

(71) Applicant: Lisa Dräxlmaier GmbH, Vilsbiburg (DE)

(72) Inventors: Bernhard Bayersdorfer, Baierbach (DE); Alexandr Zaviyalov, Landshut (DE)

(*) Notice: Subject to any disclaimer, the term of this patent is extended or adjusted under 35 U.S.C. 154(b) by 0 days.

(21) Appl. No.: 16/866,604

(22) Filed: May 5, 2020

(65) Prior Publication Data
US 2020/0262343 A1 Aug. 20, 2020

Related U.S. Application Data

(62) Division of application No. 15/806,996, filed on Nov. 8, 2017, now Pat. No. 10,682,951.

(30) Foreign Application Priority Data

Nov. 9, 2016 (DE) .................. 10 2016 121 475

(51) Int. Cl.
*B60Q 3/62* (2017.01)
*B60Q 3/00* (2017.01)
(Continued)

(52) U.S. Cl.
CPC .............. *B60Q 3/62* (2017.02); *B60Q 3/00* (2013.01); *B60Q 3/20* (2017.02); *G02B 6/0036* (2013.01);
(Continued)

(58) Field of Classification Search
CPC ... B60Q 3/00; B60Q 3/20; B60Q 3/62; G02B 6/0036; G02B 6/0058; G02B 6/0065
(Continued)

(56) References Cited

U.S. PATENT DOCUMENTS 6,174,064 B1  1/2001  Kalantar et al.
7,810,893 B2  10/2010 Chang
(Continued)

FOREIGN PATENT DOCUMENTS

DE  10 2005 047 793 A1  4/2007
DE  10 2008 056 985 A1  5/2010
(Continued)

OTHER PUBLICATIONS

Machine Translation of EP2853806.
German Office Action for German Application No. 10 2016 121 475.2, dated Jun. 22, 2017.

*Primary Examiner* — Jason M Han
(74) *Attorney, Agent, or Firm* — Jacob Eisenberg

(57) ABSTRACT

An optical conductor has several spherically curved light-extraction areas on its surface that are arranged in spaced relationship to one another and have a particular height (h) and a particular radius (R) of surface curvature, wherein h/R ratios of the respective height to the respective radius of all light-extraction areas are substantially equal and lie within a range of 0.1 to 0.45. A lighting system comprises one or more optical conductors and one or more light sources for irradiation of at least one light-injection area of the optical conductor, wherein useful light radiated from the front of the optical conductor can be emitted unscattered from the lighting system and/or interference light emitted outside of a useful light path is absorbable by the lighting system. Some embodiments may be particularly applicable in vehicle lighting systems.

14 Claims, 6 Drawing Sheets

(51) Int. Cl.
*B60Q 3/20* (2017.01)
*F21V 8/00* (2006.01)

(52) U.S. Cl.
CPC ......... *G02B 6/0058* (2013.01); *G02B 6/0065* (2013.01); *B60Q 2500/10* (2013.01)

(58) Field of Classification Search
USPC .................................. 362/617–620, 623–626
See application file for complete search history.

(56) References Cited

U.S. PATENT DOCUMENTS

| | | | |
|---|---|---|---|
| 7,863,544 | B2 | 1/2011 | Serruys et al. |
| 8,814,410 | B2 * | 8/2014 | McCollum .............. G09F 13/18 |
| | | | 362/607 |
| 2004/0085749 | A1 | 5/2004 | Parker et al. |
| 2011/0176325 | A1 * | 7/2011 | Sherman .............. G02B 6/0045 |
| | | | 362/551 |
| 2013/0178952 | A1 | 7/2013 | Wersborg |
| 2015/0185091 | A1 | 7/2015 | Hasegawa |
| 2017/0051386 | A1 | 2/2017 | Carter et al. |

FOREIGN PATENT DOCUMENTS

| | | |
|---|---|---|
| DE | 10 2011 076 621 A1 | 11/2012 |
| DE | 10 2012 215 165 A1 | 2/2014 |
| DE | 10 2014 216 780 A1 | 3/2015 |
| DE | 10 2011 082 343 B4 | 4/2015 |
| DE | 10 2014 116 180 A1 | 5/2016 |
| EP | 2853806 | 4/2015 |

* cited by examiner

OPTICAL CONDUCTOR AND LIGHTING SYSTEM

CROSS REFERENCE TO RELATED APPLICATIONS

This application is a Divisional Patent Application of U.S. patent application Ser. No. 15/806,996, filed on Nov. 8, 2017 and claims the benefit of German Patent Application No. DE 10 2016 121 475.2, filed on Nov. 9, 2016, the entire contents of both of which are incorporated herein by reference.

BACKGROUND OF THE INVENTION

The present disclosure relates to an optical conductor with several spherically curved light-extraction areas on its surface that are spaced apart from one another and have a particular height and a particular radius of surface curvature. The present disclosure also relates to a lighting system comprising one or more optical conductors and one or more light sources for irradiation of at least one light-injection area of the optical conductor. The present disclosure further relates to a method for producing an optical conductor. The present disclosure is particularly suitable for use in vehicle lighting systems.

Some optical conductors are known in the related art. For example, German application DE 10 2012 215 165 A1 discloses a composite decor, particularly for use in decor elements in vehicles, comprising an at least partially light-permeable decor layer and a luminous layer with light-emitting zones of which one or more of these light-emitting zones and the decor layer are movable relative to one another.

German application DE 10 2011 082 343 84 discloses a composite decor with a decor layer and a light-guiding layer, wherein the decor layer is perforated to form openings in the decor layer and the light-guiding layer is provided with interference points acting as individually recognizable luminous points, lines or areas when light is coupled into the light-guiding layer. For all angles of viewing the decor layer of the composite decor it holds true that one or more of the luminous points, lines or areas formed by the interference points are hidden by the decor layer when the decor layer is viewed from one angle, but they are visible from one or more other angles of viewing.

German application DE 10 2014 116 180 A1 discloses a lighting system for vehicle interiors, comprising a light source that emits visible light and a component arranged relative to the light source in such a manner that light emitted from the light source passes through it, and also comprising a transparent substrate with a surface area through which light emitted from the light source passes, and a lenticular screen structure having a plurality of regularly arranged lens elements and being formed on the surface area of the transparent substrate. The system also describes using the lighting system and its component to illuminate the interior of vehicles, wherein three-dimensional lighting effects are generated that can be perceived differently by a viewer/occupant in the interior space, depending on the angle of viewing.

BRIEF SUMMARY OF THE INVENTION

Exemplary embodiments of the present disclosure may address the disadvantages of the related art at least in part. For example, some embodiments may provide a means to provide a highly regular surface illumination and/or a highly regular appearance with the ability to create design effects.

Additional objects and advantages of the disclosed embodiments will be set forth in part in the following description, and in part will be apparent from the description, or may be learned by practice of the embodiments. Objects and advantages of the disclosed embodiments may be realized and attained by the elements and combinations set forth in the claims. However, exemplary embodiments of the present disclosure are not necessarily required to achieve such exemplary objects and advantages, and some embodiments may not achieve any of the stated objects and advantages.

Embodiments of the present disclosure may provide an optical conductor with a plurality of spherically curved light-extraction areas on its surface that are spaced apart from one another and have a particular height (h) and a particular radius (R) of surface curvature in which h/R ratios of the light-extraction areas are substantially equal and lie within a range of 0.1 to 0.45. In some embodiments, h/R ratios may lie within a range of 0.1 to 0.4. The stated ranges may be a mathematical range of values inclusive of endpoints and indicating a subset between 0.1 and 0.45, with the values 0.1 and 0.45 themselves being part of the subset, for example.

According to some embodiments, due to the substantially equal h/R ratios, even light from light-extraction areas of different sizes may be locally radiated with virtually the same emission characteristics (such as with equal angular distribution or light-intensity patterns), with the result that a light pattern of highly regular appearance can be generated through the light-extraction areas. Optical design effects can be created by arranging the light-extraction areas over a surface area. Different degrees of light extraction across the surface of the optical conductor can be varied by altering the density and/or height of the light-extraction areas.

The range of 0.1 to 0.45, and in some embodiments 0.1 to 0.4, may be useful to provide the advantage that a share of the light ("useful light") extracted from the optical conductor in a desired direction is greater than that of the light in an undesired direction ("interference light"). Thus, in this range, the extraction effectiveness of the useful light is especially high. Contrary to this, large h/R ratios of greater than 0.45 may result in inefficient light extraction.

The light-extraction areas may also be referred to as interference points.

The optical conductor may be a transparent body such as one of plastic (e.g., epoxy resin, PC, PMMA, ABS, silicone, etc.) or of glass. The optical conductor may also be designed to guide light by total internal reflection and may then also be referred to as a TIR body.

In some embodiments, a spherically curved light-extraction area may be a surface area of the optical conductor with a cross-section at least in one plane having a surface curvature in the shape of a circle segment. Therefore, the light-extraction area has a specific (maximum) height h in relation to an adjacent surface area of the optical conductor. A corresponding (circular) radius R is associated with the surface curvature.

The h/R ratios of the light-extraction areas may be substantially equal, and in some embodiments, may be identical. In particular, h/R ratios that are substantially equal may be understood to be ratios that differ little enough from one another that distribution of the useful light radiated from the optical conductor is not impeded for practical purposes. In some embodiments, h/R ratios of the light-extraction areas may be within a range of +/−10% from a nominal value. In some embodiments, h/R ratios of the light-extraction areas may be within a range of +/−5% from a nominal value. In some embodiments, h/R ratios of the light-extraction areas may be within a range of +/−2% from a nominal value. In some embodiments, h/R ratios of the light-extraction areas may be within a range of +/−1% from a nominal value.

In some embodiments, the height of at least two light-extraction areas may differ according to their respective radii. For example, height may be increased in order to extract more light using a light-extraction area. However, to maintain a uniform light radiation pattern generated locally by the light extraction area, the radius must be enlarged accordingly.

In an embodiment, for example, the height and thus the radius of the light-extraction areas increase with increasing distance from a light-injection area of the optical conductor. Accordingly, it may be possible for light to be emitted by the optical conductor with uniform brightness over an area as well. The increase can be continuous or almost continuous, alternatively in steps or areas, which simplifies production. Alternatively, or additionally, for the same purpose, the density of the light-extraction areas may be increased with increasing distance from the light-injection area.

In some embodiments, for example, when the h/R ratio lies within a range of 0.25 to 0.35, a broad angular distribution (light intensity distribution) of useful light may be extracted from the light-extraction area.

In some embodiments, for example, the h/R ratio is at least approximately 0.3, and in some embodiments may be exactly 0.3. Accordingly, a combination of high extraction efficiency and broad light radiation may be achieved. If the h/R ratio is at least approximately 0.3, then, for example, this may correspond to a fluctuation range of +/−10%, specifically +/−5%, specifically +/−2%, specifically +/−1%.

In an embodiment, for example, the height of at least two light-extraction areas differ. Different degrees of light extraction can be varied, or different quantities of light per light-extraction area can be set.

In some embodiments, the radius R lies within a range of 0.1 mm to 1 mm. Yet another embodiment provides that the height h lies within a range of 0.01 mm to 1 mm.

In some embodiments, the at least one light-extraction area has a spherical cap shape; and in some embodiments, all light-extraction areas have a spherical cap shape. This may enable implementation of especially uniform and easy-to-produce light-extraction areas, for example, by means of drilling with a ball cutter.

In some embodiments, the at least one light-extraction area has a spherical line shape; and in some embodiments, all light-extraction areas have a spherical line shape. In particular, a spherical line shape can be understood to be a line form created by a lateral translation of a spherical cap-shaped surface. The end sections of the otherwise cylinder section-shaped spherical line form have a semicircular peripheral contour, for example, when viewed from above. This enables implementation of easy-to-produce light-extraction areas, for example, by means of a bore and lateral displacement of a ball cutter. Furthermore, spherical line-shaped light-extraction areas may provide that the degree of light extraction can be easily varied by adjusting their length.

In some embodiments, the optical conductor is provided in the shape of a plate with a back and a front, the front being provided for the extraction of useful light and the light-extraction areas being provided on the front and/or on the back. In this way, a flat optical conductor with a large light-radiating area can be provided. In a further embodiment, light can be coupled into the optical conductor through a lateral surface. The optical conductor may have a constant thickness.

In some embodiments, the light-extraction areas are configured to provide uniformly bright radiation of useful light over an area. For example, the light-extraction areas may be arranged and/or dimensioned in a particular manner. For example, in the case of a lateral light injection or irradiation, the light-extraction areas may be arranged and/or dimensioned so that the height or radius of the light-extraction areas increases as the distance from the light-injection side of the optical conductor increases. According to some embodiments, the optical conductor is also capable of radiating large-area light with highly uniform brightness. Furthermore, the density of the light-extraction areas may be increased with increasing distance from the light-injection area.

In general, the size and/or density selected for the light-extraction areas may be configured so that for typical distances from the observer, the light-extraction areas are not consciously perceived as being distinct areas. For example, if the density of the light-extraction areas is sufficiently high or a lateral spacing of the light-extraction areas from one another is close enough, the impression may be made that the surface—particularly the front—of the optical conductor is regular or has been uniformly processed.

According to some embodiments, the light-extraction areas are arranged and/or dimensioned for unevenly bright radiation of useful light over an area. Thus, variable-brightness design effects such as fonts, symbols, patterns, etc. may be introduced with ease. Furthermore, since the light-extraction areas have substantially the same emission characteristics due to their substantially equal h/R ratio, the variation of brightness generated does not change depending on the angle.

According to some embodiments, at least one light-extraction area is a depression. The depression may be made directly into the optical conductor, for example by material removal as with a ball cutter. In the case of a depression, the height h may also be understood to be the depth of the recess relative to the surrounding surface area. To provide recesses with different depths h, for instance, drill bits with different radii may be used.

According to some embodiments, at least one light-extraction area is a protrusion. This can be produced, for example, by means of a tool such as a casting element. Recesses complementary to the protrusions may be introduced into the tool, for instance by means of a ball cutter.

Embodiments of the present disclosure also relate to a lighting system comprising one or more optical conductors as described above and one or more light sources for irradiation of at least one light-injection area of the optical conductor. The lighting system may yield similar advantages as the optical conductor and can be designed analogously.

In some embodiments, the lighting system may be configured to emit useful light radiated from one side (e.g., the "front side") of the optical conductor. Useful light can be emitted unscattered from the lighting system, meaning with no scattering element (such as a diffusing disk) optically connected downstream of the optical conductor. This allows for a particularly simple and inexpensive structure.

In some embodiments, the lighting system is configured to absorb interference light. For example, the lighting system may be designed in such a manner that interference light radiated from the optical conductor outside of a useful light path may be absorbed by the lighting system. A useful light path may be a predetermined direction in which light may travel to be emitted towards an outside observer. For example, a useful light path may comprise a path perpendicular to a front of the optical conductor. Interference light may be light emitted in a different direction from the useful light path. In some embodiments, a light-absorbing surface is arranged behind the optical conductor.

In some embodiments, the lighting system is a vehicle lighting system. The vehicle may be a motor vehicle (such as an automobile, truck, bus, etc., or a motorcycle), a rail vehicle, an aquatic vehicle (such as a boat or ship), or an aircraft (such as an airplane or a helicopter).

In some embodiments, the lighting system makes up the lighting system for the interior of a vehicle or a portion thereof (such as a module). This interior vehicle lighting is applicable in a particularly advantageous manner for illuminating interior surfaces with minimal sheen, as with black leather, or as luminous and/or design elements.

In some embodiments, the lighting system represents a component of a composite decor.

Furthermore, the lighting system may also be the exterior lighting of a vehicle or a part thereof (e.g., a module) such as a headlight, a taillight, etc.

In some embodiments, the light-extraction areas of the optical conductor are arranged so as to be visible from the outside (i.e. looking from the outside of the lighting system onto the same, especially onto its light-emitting surface). Thus, the light-extraction areas may also be used as design elements.

Embodiments of the present disclosure also relate to a method of production of an optical conductor as described above, in which the light-extraction areas are produced with a ball cutter. For example, this may be implemented by drilling directly into the optical conductor and/or by introducing a bore into a tool for producing the optical conductor. Cutter heads with correspondingly varying radii may be used to change the radius of the light-extraction areas. The ball cutter can be moved laterally (i.e. perpendicular to the direction of drilling) to produce a spherical line.

The described properties, features and advantages of the present disclosure, as well as the manner in which they are achieved, will become clearer and more easily understood in the following detailed description. The foregoing general description and the following detailed description are exemplary and explanatory only and are not restrictive of embodiments consistent with the present disclosure. Further, the accompanying drawings illustrate embodiments of the present disclosure, and together with the description, serve to explain principles of the present disclosure.

BRIEF DESCRIPTION OF THE SEVERAL VIEWS OF THE DRAWINGS

Further advantages, features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure. The above and other aspects of the present disclosure will become more apparent by describing exemplary embodiments in detail below with reference to the accompanying drawings, in which.

The figures are schematic representations and are used purely to explain certain exemplary embodiments. Similar elements, or those that work in a similar way, are provided with the same reference characters throughout.

DETAILED DESCRIPTION OF THE INVENTION

As used throughout the present disclosure, the expression "A and/or B" shall mean A alone, B alone, or A and B together. Expressions such as "at least one of" do not necessarily modify an entirety of a following list and do not necessarily modify each member of the list, such that "at least one of A, B, and C" should be understood as including only one of A, only one of B, only one of C, or any combination of A, B, and C. Furthermore, the conjunctive term "or" shall be construed in its broadest sense, for example, meaning that only one of the listed elements need be present, and that additional elements may also be present.

Figure 1:
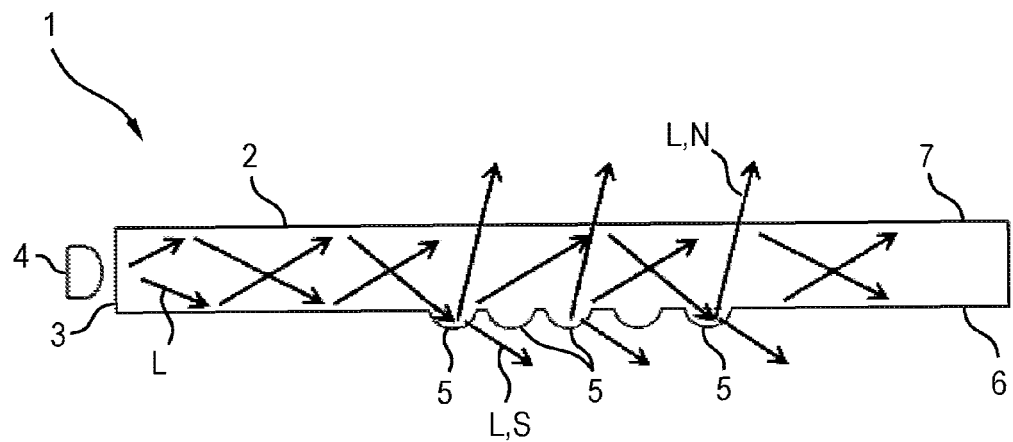
FIG. 1 shows a lateral cross-section of a lighting system with an optical conductor in accordance with a first embodiment of the present disclosure having several light-extraction areas.

FIG. 1 shows a lateral cross-section of a lighting system 1 with a plate-shaped optical conductor 2 in accordance with a first embodiment. The optical conductor 2 has a lateral surface 3 serving as a light-injection surface to couple in light L. The light L in this case is generated, for example, by one or more LEDs 4 aimed at the lateral surface 3. The light L coupled in at the lateral surface 3 spreads by total internal reflection in the optical conductor 2. When the light L strikes a light-extraction area 5, it is deflected in such a manner that it can subsequently exit the optical conductor 2. The light-extraction areas 5 thus act as interference points in the light conduction. The light-extraction areas 5 here are arranged on a back 6 of the optical conductor 2.

Figure 12:
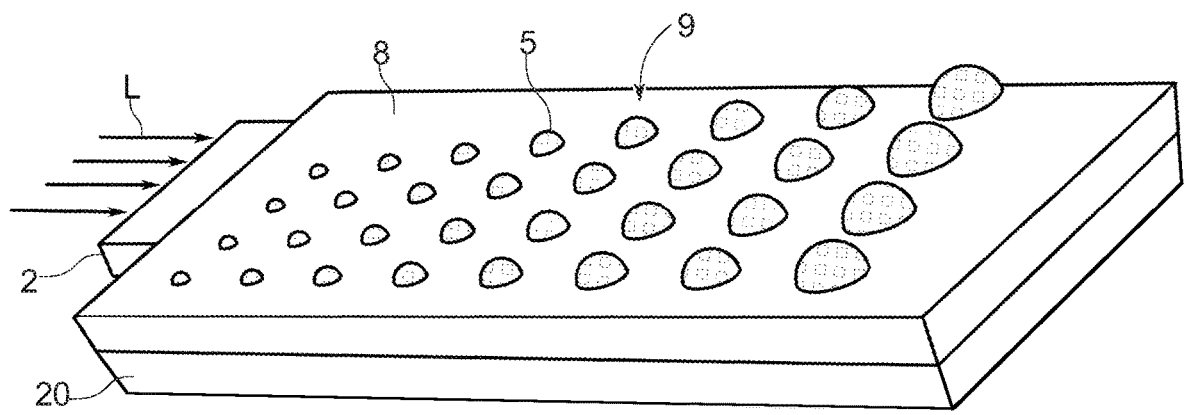
FIG. 12 shows the lighting system configured to absorb interference light radiated outside of a useful path.
Figure 13:
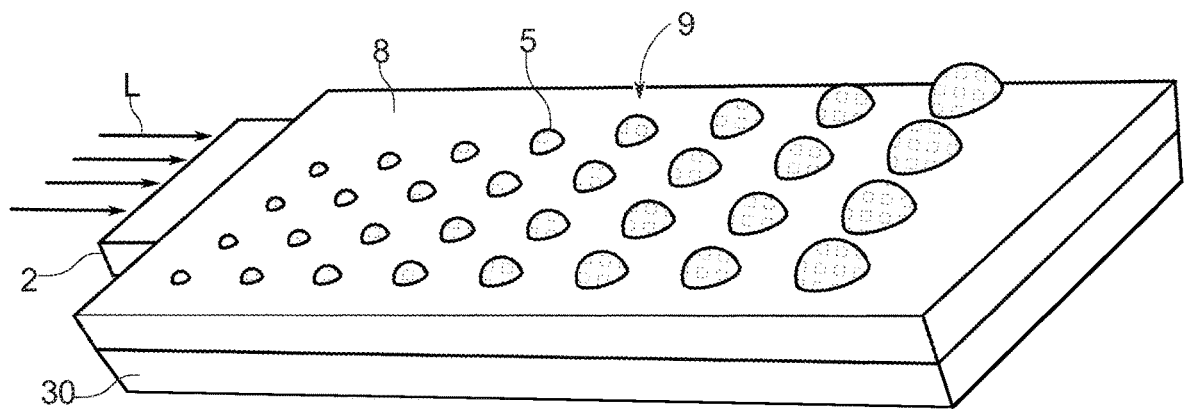
FIG. 13 shows another view of the lighting system configured to absorb interference light radiated outside of a useful path.

A portion of the light L deflected from the light-extraction areas 5 exits the optical conductor 2 at the back 6. Some of this light may be interference light S. Interference light S may not be further used. For example, as depicted (not to scale) in FIGS. 12 and 13, the interference light can be absorbed by an absorbent surface 20 (FIG. 12) and/or it can be reflected by a reflecting surface 30 (FIG. 13) and, where applicable, it can then be at least partly reused as useful light. Returning to FIG. 1, another portion of the light L deflected from the light-extraction areas 5 exits the optical conductor 2 at a front 7 and, being useful light N, it is further used.

Figure 2:
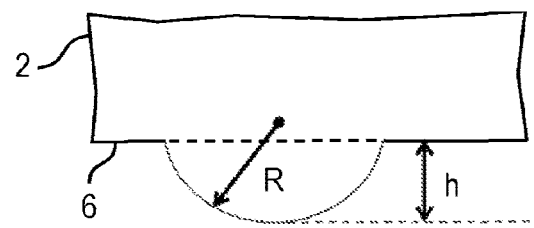
FIG. 2 shows a detail of an optical conductor according to FIG. 1 in the vicinity of a light-extraction area.

As shown in FIG. 2 as a detailed view, the light-extraction areas 5 may be embodied as spherically curved protrusions with a spherical cap-shaped surface. The light-extraction areas 5 have a height h. A constant radius R may be assigned to the spherical cap-shaped surface. In the first embodiment, all light-extraction areas 5 have an equal h/R ratio of 0.3.

The light-extraction areas 5 shown in FIG. 1 may have different heights h and/or radii R, as long as the same h/R ratio is maintained. In particular, light-extraction areas 5 spaced farther away from the lateral surface 3 may have a larger height h and a larger radius to locally radiate a larger quantity of light. Accordingly, a particular quantity of light radiated from the light-extraction areas 5 can be kept constant, thereby facilitating uniformly bright emission of useful light N over the entire front 7.

As an alternative to a spherical cap-shaped surface, the light-extraction areas 5 may have a respective spherical line shape in which they extend longitudinally in a direction perpendicular to an image plane of the optical conductor 2.

Alternatively or additionally, light-extraction areas 5 may be provided on the front 7.

The lighting system 1, for example, may be external vehicle lighting such as a headlight or internal vehicle lighting such as decor illumination, or it may be a component thereof.

In particular, following its emission the useful light N may be radiated unscattered out of the lighting system 1 from the front 7. A dissipating layer may therefore be omitted. Accordingly, provided that the optical conductor 2 is visible, the light-extraction areas 5 may be viewed from the outside. The light-extraction areas 5 may then be used as design elements.

Figure 3:
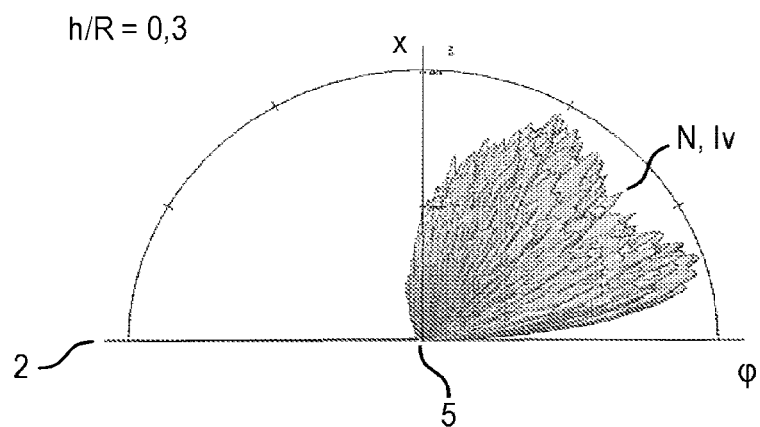
FIG. 3 shows a polar diagram of a light intensity distribution for an h/R ratio of 0.3.

FIG. 3 shows a polar diagram of a light intensity distribution Iv of the useful light N across a polar angle cp for an h/R ratio of 0.3. At h/R=0.3, the useful light N is emitted in a relatively large solid angle range. Furthermore, useful light N is emitted in a direction x that is perpendicular to the front 7.

Figures 4, 5:
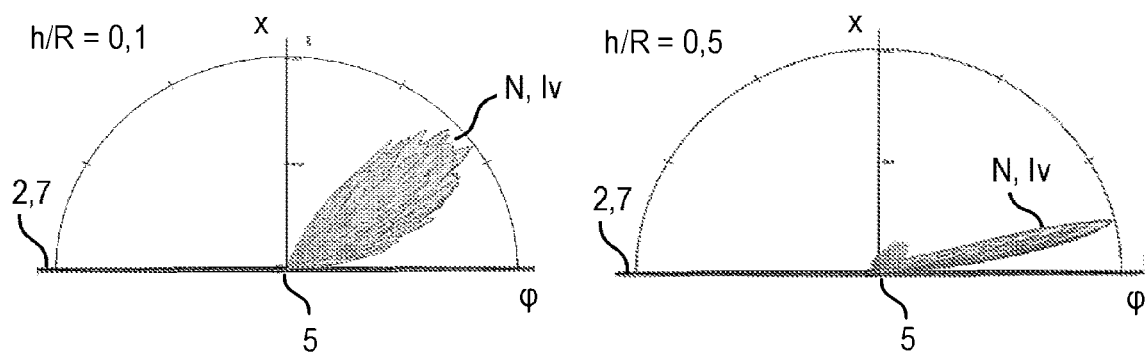
FIG. 4 shows a polar diagram of a light intensity distribution for an h/R ratio of 0.1.
FIG. 5 shows a polar diagram of a light intensity distribution for an h/R ratio of 0.5.

FIG. 4 shows a polar diagram analogous to FIG. 3 for an h/R ratio of 0.1. Compared to the h/R ratio of 0.3, the emission takes place in a narrower solid angle range. The light radiation in the perpendicular direction x is virtually zero.

FIG. 5 shows a polar diagram analogous to FIG. 3 for an h/R ratio of 0.5. Compared to the h/R ratio of 0.1, the emission takes place in an even more narrow solid angle range with a primary direction of radiation that deviates even more strongly from the perpendicular direction x. The light radiation along the perpendicular direction x is very low.

Figure 6:
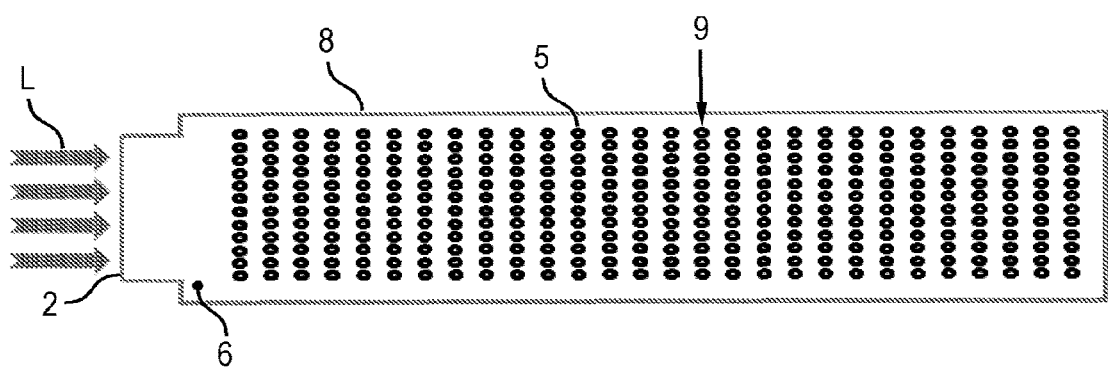
FIG. 6 shows a plan view of an optical conductor according to a second embodiment of the present disclosure.

FIG. 6 shows a plan view of the back 6 of an optical conductor 8 according to a second embodiment. In optical conductor 8, the light-extraction areas 5 are arranged in transverse rows 9 that are uniformly spaced in a longitudinal direction of the optical conductor 8. The light-extraction areas 5 thereby form a rectangular matrix-shaped surface pattern. The light-extraction areas 5, for example, may have an equal height h within each of the transverse rows 9. The height h of the light-extraction areas 5 of the individual transverse rows 9 may increase with increasing distance from the lateral surface 3. For example, height h of the light-extraction areas 5 in an individual transverse row 9 may increase relative to an adjacent transverse row 9, or in blocks of every n>=2 transverse rows 9, etc.

Alternatively, the light-extraction areas 5 may be arranged in groups.

The groups may be distributed over the optical conductor in a matrix-like manner.

Figure 7:
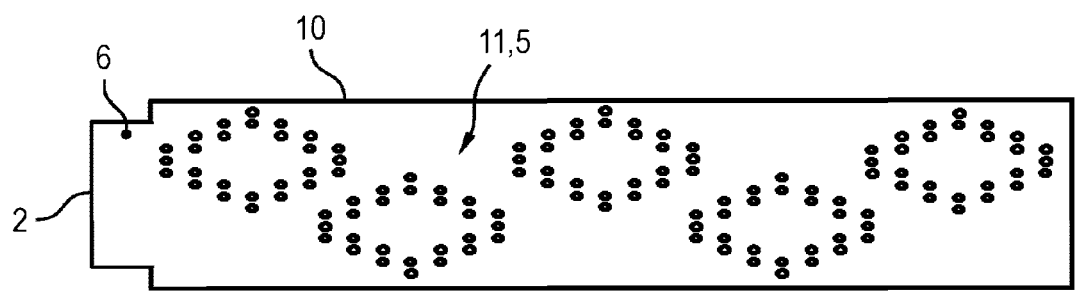
FIG. 7 shows a plan view of an optical conductor according to a third embodiment of the present disclosure.

FIG. 7 shows a plan view of an optical conductor 10 according to a third embodiment. The optical conductor 10 has the light-extraction areas 5 arranged in diamond-shaped groups 11.

Figure 8:
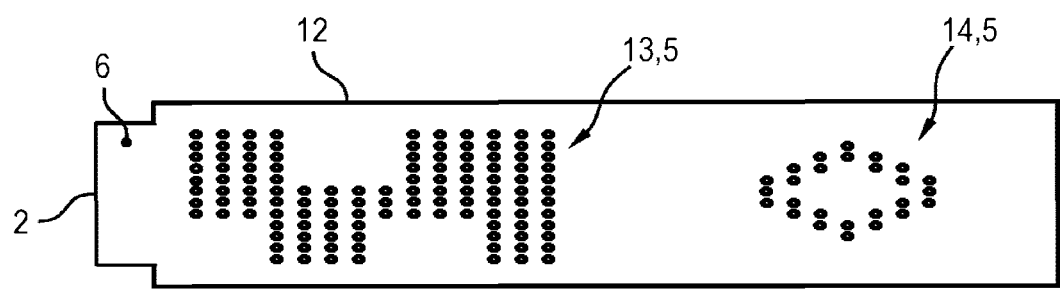
FIG. 8 shows a plan view of an optical conductor according to a fourth embodiment of the present disclosure.

FIG. 8 shows a plan view of an optical conductor 12 according to a fourth embodiment. The structure of the optical conductor 12 is similar to that of the optical conductor 10. However, the light-extraction areas 5 are now arranged in differently shaped groups 13, 14.

Figure 9:
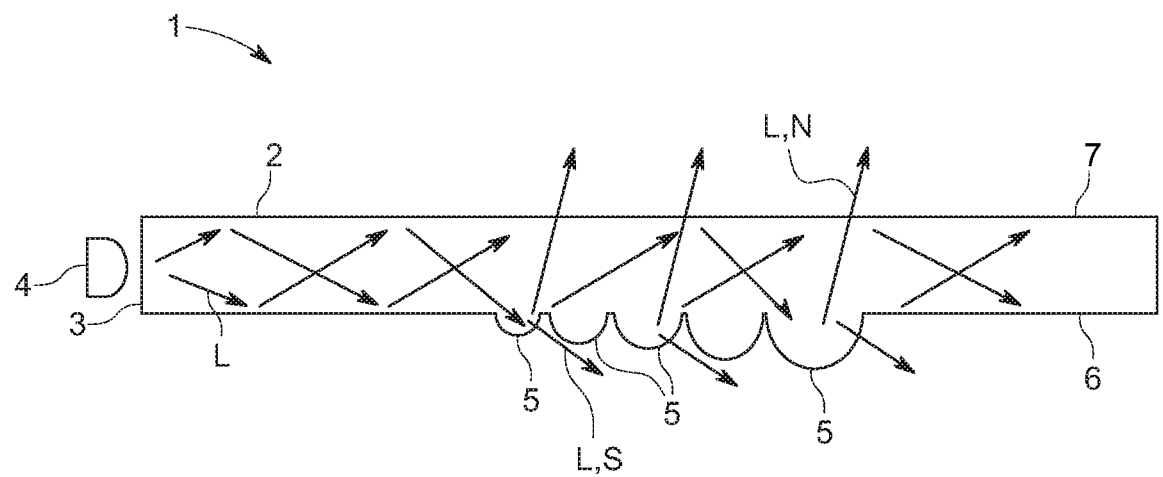
FIG. 9 shows differing heights of two or more light-extraction areas of the plurality of light extracting areas.
Figure 10:
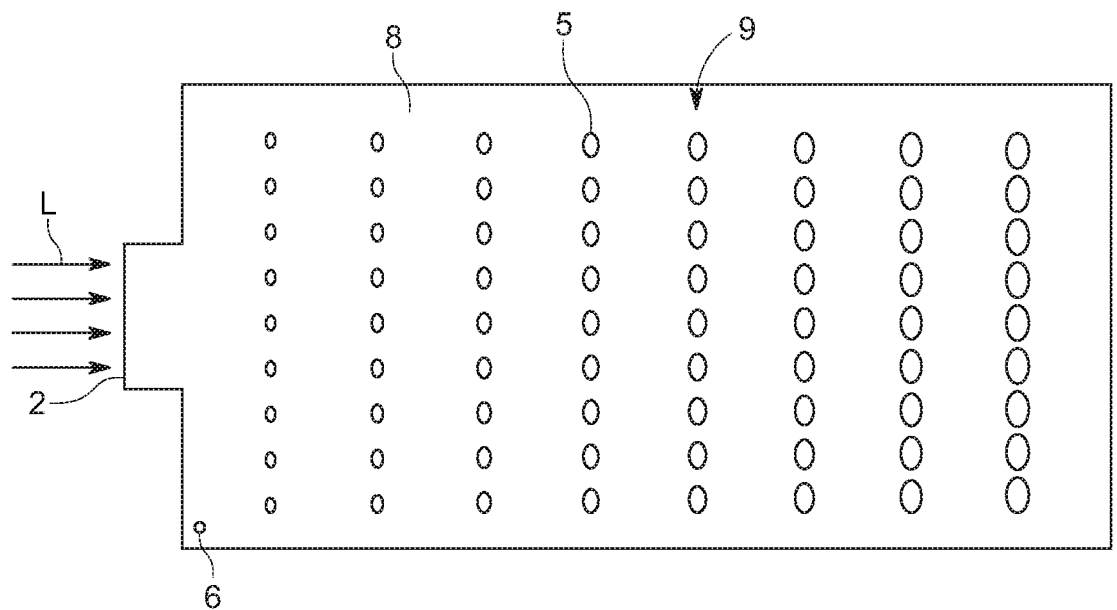
FIG. 10 shows radius of spherical curved light extraction areas along the length of the curved light-extraction area and along the length of the optical conductor increasing with distance from the light source.
Figure 11:
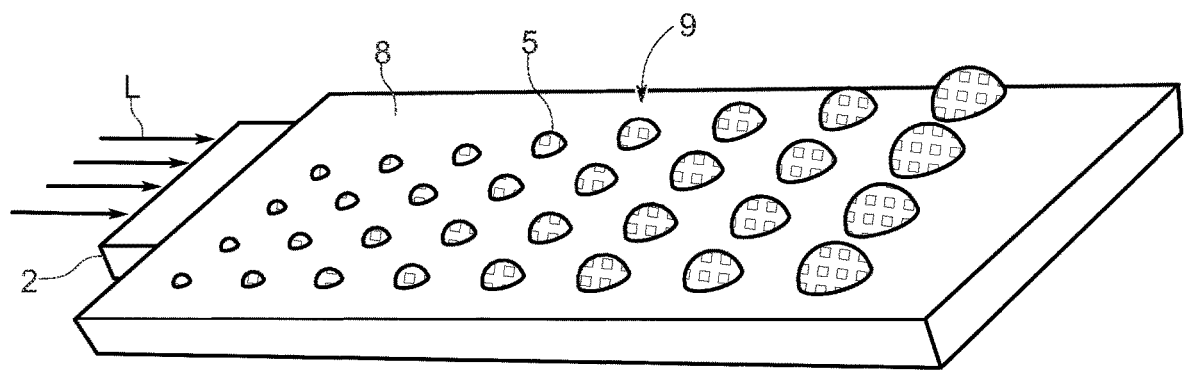
FIG. 11 shows respective heights of the plurality of light-extraction areas increasing with distance from a light-injection area of the optical conductor.

FIGS. 9-11 depict respective heights of the plurality of light-extraction areas increasing with increasing distance from a light-injection area of the optical conductor. Additionally, these figures depict respective heights of two or more light-extraction areas of the plurality of light-extraction areas along with the radius (r) of each spherically curved light-extraction area along the length of the curved light-extraction area and along the length of the optical conductor increasing according to the distance from the light source of the respective spherically curved light-extraction area(s). Still further, the spherically curved light-extraction areas, with the increasing height (h) and increasing radius (r), along the length configured to have the same h/R ratio is depicted.

It will be appreciated that the present disclosure is not limited to the embodiments illustrated.

In general, by "a," "an," "the," etc., a singular or plural may be understood, particularly in the sense of "at least one" or "one or more," etc., as long as this is not explicitly ruled out, for instance by the expression "exactly one" etc.

Also, a number can indicate precisely the given number, or it can also include a customary tolerance range, as long as this is not expressly ruled out.

Having described aspects of the present disclosure in detail, it will be apparent that further modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

What is claimed is:

1. A lighting system comprising one or more optical conductors and one or more light sources for irradiation of at least one light-injection area of the one or more optical conductors, wherein the one or more optical conductors comprises a plurality of spherically curved light-extraction areas arranged on a surface of the one or more optical conductors in spaced relationship to one another, each of the plurality of spherically curved light-extraction areas having a height (h) and a radius (R) of surface curvature, wherein h/R ratios of respective height to respective radius of all of the plurality of light-extraction areas are substantially equal, the h/R ratios lie within a range of 0.1 to 0.45, and the radius lies within a range of 0.1 mm to 1 mm and the height lies within a range of 0.01 mm to 1 mm, and the one or more optical conductors is provided in the shape of plate with a back and a front, the front being configured to extract useful light, and the plurality of light-extraction areas being provided on the front and/or on the back, wherein the lighting system is configured to emit useful light capable of radiating from the front of the one or more optical conductors unscattered, and wherein the lighting system further comprises at least one of a reflective surface and an absorptive surface configured to adsorb interference light radiated outside of a useful light path.

2. The lighting system according to claim 1, wherein the lighting system is a vehicle lighting system.

3. The lighting system according to claim 1, wherein the lighting system is a vehicle interior lighting system.

4. The lighting system according to claim 3, wherein the lighting system is a component of a composite decor.

5. The lighting system according to claim 1 wherein the plurality of light-extraction areas of the one or more optical conductors are arranged so as to be visible from the outside.

6. The lighting system according to claim 1, wherein heights of the plurality of light-extraction areas increase with increasing distance from a light-injection area of the optical conductor.

7. The optical conductor according to claim 1, wherein respective heights of two or more light-extraction areas of the plurality of light-extraction areas differ.

8. The optical conductor according to claim 1, wherein at least one light-extraction area of the plurality of light-extraction areas has a spherical cap shape.

9. The optical conductor according to claim 1, wherein at least one light-extraction area of the plurality of light-extraction areas has a spherical line shape.

10. The optical conductor according to claim 1, wherein the optical conductor is provided in the shape of a plate with a back and a front, the front being configured to extract useful light, and the plurality of light-extraction areas being provided on the front and/or on the back.

11. The optical conductor according to claim 1, wherein the plurality of light-extraction areas is arranged for uniformly bright radiation of useful light over an area.

12. The optical conductor according to claim 1, wherein the plurality of light-extraction areas is configured to provide uniformly bright radiation of useful light over an area.

13. The optical conductor according to claim 1, wherein the light extraction areas are arranged in differently shaped groups.

14. A method of production of an optical conductor, the optical conductor comprising:

a plurality of spherically curved light-extraction areas arranged on a surface of the optical conductor in spaced relationship to one another, each of the plurality of spherically curved light-extraction areas having a height (h) and a radius (R) of surface curvature, wherein h/R ratios of respective height to respective radius of all of the plurality of light-extraction areas are substantially equal, and the h/R ratios lie within a range of 0.1 to 0.45, and the radius lies within a range of 0.1 mm to 1 mm and the height lies within a range of 0.01 mm to 1 mm; and the method comprising producing the plurality of light-extraction areas with a ball cutter.

* * * * *